United States Patent [19]
Daoud

[11] Patent Number: 6,113,067
[45] Date of Patent: Sep. 5, 2000

[54] SELF-SEALING PRESSURE VALVE ASSEMBLY

[75] Inventor: Bassel H. Daoud, Parsippany, N.J.

[73] Assignee: Lucent Technologies Inc., Murray Hill, N.J.

[21] Appl. No.: 09/396,552

[22] Filed: Sep. 7, 1999

[51] Int. Cl.[7] .................................................. F16K 51/00
[52] U.S. Cl. ............................................................ 251/144
[58] Field of Search ............................. 251/144; 152/427, 152/429

[56] References Cited

U.S. PATENT DOCUMENTS

| | | | |
|---|---|---|---|
| 552,722 | 1/1896 | Schrader et al. | 152/427 |
| 1,187,376 | 6/1916 | Oja | 251/144 |
| 1,792,825 | 2/1931 | Disney | 152/427 |
| 2,234,056 | 3/1941 | Moore | 251/144 |
| 4,650,158 | 3/1987 | Roberts | 251/144 |

*Primary Examiner*—Kevin Shaver
*Assistant Examiner*—David A Bonderer
*Attorney, Agent, or Firm*—David L. Davis

[57] ABSTRACT

A self-sealing pressure valve assembly which eliminates O-rings by providing a tapered annular projection on one side of a wall closely surrounding an opening through which the valve is installed. A complementary engaging projection is provided on a locking member of the valve assembly. In addition, the wall opening and the valve body are tapered on the side opposite the projections. Thus, the projections provide a seal on one side of the wall and the tapers provide a seal on the other side of the wall when the locking member fully engages the valve body, as by threads.

5 Claims, 2 Drawing Sheets

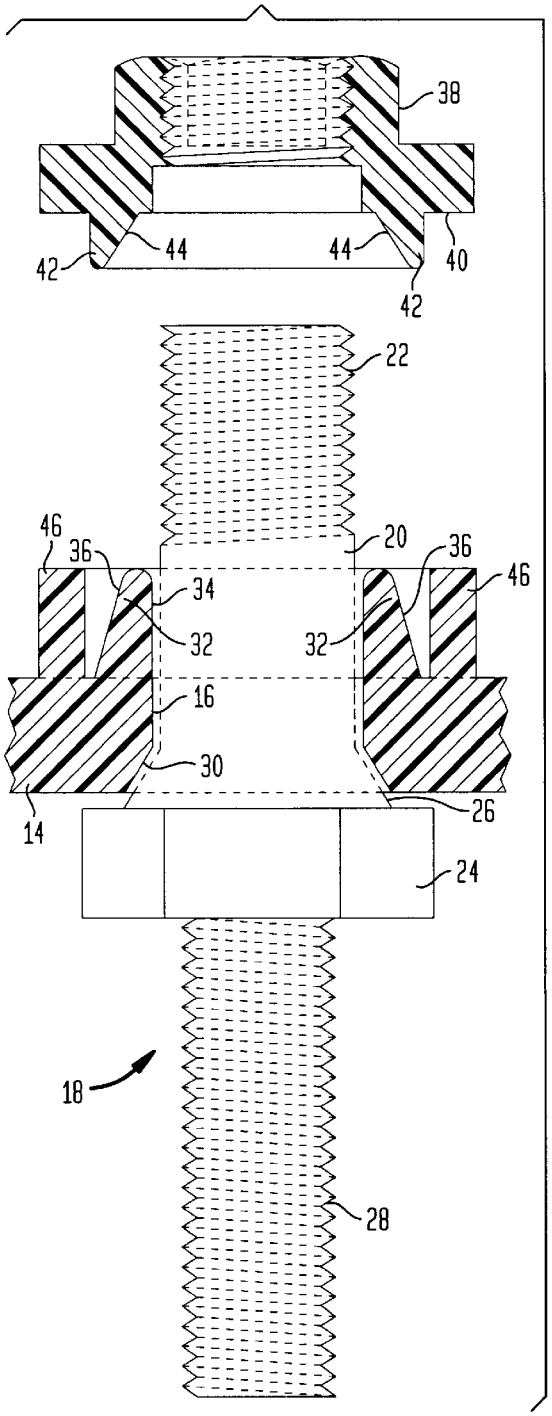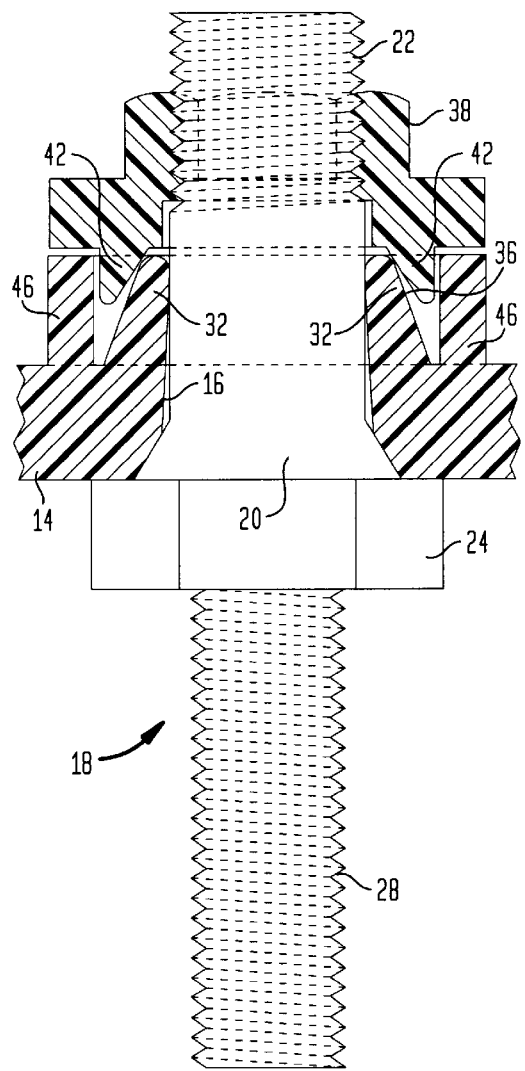

SELF-SEALING PRESSURE VALVE ASSEMBLY

BACKGROUND OF THE INVENTION

This invention relates to pressure valves and, more particularly, to a self-sealing pressure valve assembly which effects an external seal without the use of an O-ring or similar gasket.

Large fiber optic cables are broken down and spliced into smaller cables in a fiber optic splice closure. The closure is a box which is typically made of polypropylene and is sealed to prevent air and water from getting in in order to prevent damage to the fibers, since such closures are usually buried underground outdoors. Accordingly, in the field, a technician must test that the closure is properly sealed. It is therefore conventional to install a Schrader valve through a wall of the closure. Pressurized air is then inserted through the valve and the closure seals are checked for leaks. In the past, it was typical to use an O-ring for sealing the valve to the wall of the closure. It would be desirable to provide such a valve which can be sealed to a wall of the closure without the necessity for an O-ring, which can be expensive to purchase and install.

SUMMARY OF THE INVENTION

According to the present invention, there is provided a self-sealing pressure valve assembly for installation through an opening in a wall. The assembly comprises a valve having a body with an enlarged flange which prevents passage of the valve through the opening. The body has an externally threaded end which extends beyond one side of the wall when the valve is inserted through the wall with the flange on the other side of the wall. An internally threaded locking member is installable on the threaded end of the valve body. The locking member has a tapered annular projection facing the wall and surrounding the valve body threaded end. On the one side of the wall closely surrounding the opening there is a tapered annular projection which is complementary to the locking member projection, the wall projection being encircled by the locking member projection. Accordingly, when the locking member is tightened on the valve body externally threaded end, the wall projection is moved into engagement with the valve body to effect a seal on the one side of the wall.

In accordance with an aspect of this invention, the opening tapers inwardly from the other side of the wall and the valve body tapers inwardly from the flange toward the externally threaded end. Accordingly, as the locking member is tightened on the externally threaded end of the valve body, the tapers of the valve body and the opening are drawn together to effect a seal. Thus, the valve is sealed on both sides of the wall.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 2 is an enlarged exploded cross sectional view of the valve assembly shown in FIG. 1: and FIG. 3 is an enlarged cross sectional view showing the inventive valve assembly sealed to the closure wall.

DETAILED DESCRIPTION

Figure 1:
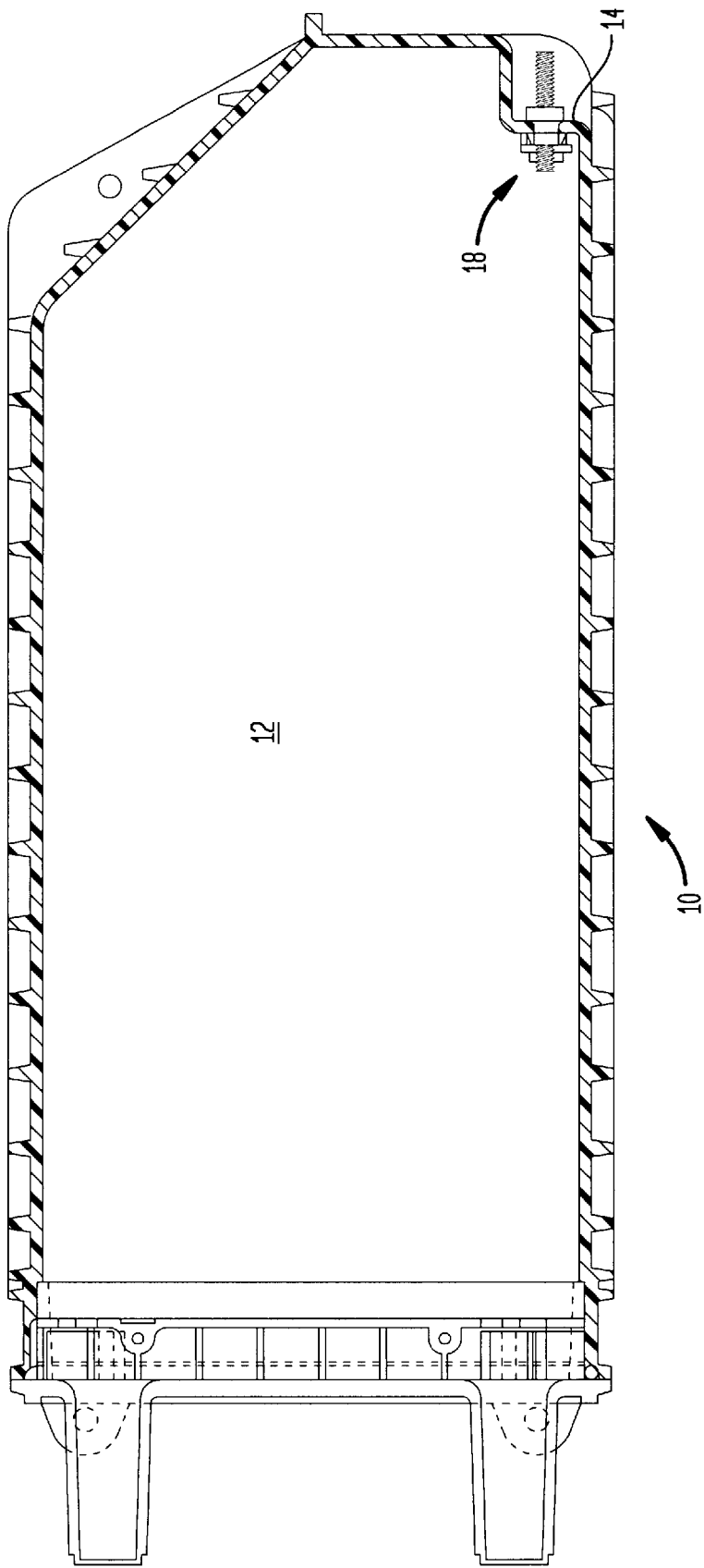
FIG. 1 is a cross sectional view of a fiber optic splice closure including an embodiment a valve assembly constructed in accordance with the present invention.

FIG. 1 illustrates a fiber optic splice closure, designated generally by the reference numeral 10, with which the present invention finds utility. The closure 10 has an interior 12 for holding splices between a large fiber optic cable and several smaller fiber optic cables. As previously discussed, the closure 10 is sealed to prevent leakage therein which could damage the fibers. To test for proper sealing, a wall 14 of the closure 10 is provided with an opening 16 (FIG. 2) through which a pressure valve assembly 18 is installed. The valve assembly 18 is used for the admission of pressurized air into the closure interior 12. The closure 10 is then checked for leaks, for example, by immersing it in water and looking for air bubbles. As best seen in FIGS. 2 and 3, the valve assembly 18 illustratively includes a Schrader valve, which is a valve of the type used on automobile tires, which has a body portion 20 with external threads 22 on one end and an enlarged flange 24 on the other end. Between the threads 22 and the flange 24, the exterior of the valve body 20 is circular in axial cross-section, and is smooth with a taper 26 adjacent the flange 24. The threaded portion 28 is that portion to which a supply of pressurized air is connected.

The opening 16 through the wall 14 is smaller than the valve body flange 24 and has a tapes 30 on the side facing the exterior of the closure 10 which matches the taper 26 of the valve body 20. The interior side of the wall 14 is formed with a tapered annular projection 32 closely surrounding the opening 16. Preferably, the inner wall 34 of the projection 32 is a continuation of the opening 16 and it is the exterior wall 36 of the projection 32 which is tapered. The wall 14 is further formed with an additional annular projection 46 surrounding the projection 32 and terminating at substantially the same distance from the wall 14 as the projection 32.

The valve assembly 18 also includes an internally threaded locking member 38 which is installable on the threads 22 of the valve body 20. The locking member 38 has a flange 40 with a tapered annular projection 42 which is tapered on its interior wall 44 and is sized to encircle the projection 32 of the wall 14, so that the tapered interior wall 44 of the projection 42 engages the tapered exterior wall 36 of the projection 32.

For installation, the valve body 20 is inserted into the opening 16 from the exterior of the closure 10 and with the threaded end 22 extending into the interior 12 of the closure 10. The flange 24 limits the inward travel of the valve body 20 into the interior 12. The locking member 38 is then threaded onto the threads 22 from the interior 12 of the closure 10. Preferably, the locking member 38 and the flange 24 are formed so that they can be gripped for turning, illustratively by being hexogonal. As the locking member 38 is tightened on the threads 22, the projection 42 engages the projection 32 and causes it to be compressed radially inwardly to engage the valve body 20, as shown in FIG. 3. At the same time, the valve body 20 is drawn inwardly of the opening 16 so that the tapers 26, 30 become engaged. The projection 46 engages the flange 40 to limit the threading of the locking member 38 onto, the valve body 20.

Thus, when the locking member 38 is fully threaded on the valve body 20, there are seals on both sides of the wall 14. On the interior side of the wall 14, there is a seal between the inner wall 34 of the projection 32 and the exterior of the valve body 20. On the exterior side of the wall 14, there is a seal between the taper 26 of the valve body 20 and the taper 30 of the opening 16.

Accordingly, there has been disclosed an improved self-sealing pressure valve assembly which effects an external seal without the use of an O-ring or similar gasket. While an illustrative embodiment of the present invention has been disclosed herein, it is understood that various adaptations and modifications to the disclosed embodiment are possible and it is intended that this invention be limited only by the scope of the appended claims.

What is claimed is:

1. A self-sealing pressure valve assembly for installation through an opening in a wall, the assembly comprising:

a valve having a body with an enlarged flange which prevents passage of the valve through the opening, the body having an externally threaded end which extends beyond one side of the wall when the valve is inserted through the opening with the flange on the other side of the wall;

an internally threaded locking member installable on the threaded end of the valve body, the locking member having a tapered annular projection facing the wall and surrounding the valve body threaded end; and a tapered annular projection on the one side of the wall closely surrounding the opening and complementary to the locking member projection;

wherein the wall projection is encircled by the locking member projection;

whereby when the locking member is tightened on the valve body externally threaded end the wall projection is moved into engagement with the valve body to effect a seal on the one side of the wall.

2. The assembly according to claim 1 wherein the opening tapers inwardly from said other side of the wall and the valve body tapers inwardly from the flange toward the externally threaded end;

whereby as the locking member is tightened on the externally threaded end of the valve body, the tapers of the valve body and the opening are drawn together to effect a seal.

3. The assembly according to claim 1 wherein the locking member includes a flange and the locking member projection is on the locking member flange, with the locking member flange extending outwardly beyond the projection, and the assembly further comprises:

an additional annular projection on the one side of the wall surrounding the tapered annular wall projection, the additional wall projection engaging the locking member flange to limit the threading of the locking member on the valve body externally threaded end.

4. The assembly according to claim 1 wherein the valve body exterior is smooth in the region where it is surrounded by the wall opening and the wall projection.

5. The assembly according to claim 1 wherein the wall is part of a closure having an interior, and the wall projection is on the interior side of the wall.

* * * * *